3,236,596
PROCESS FOR THE DECOMPOSITION OF TITANIUM DIOXIDE-CONTAINING MINERALS WITH HYDROCHLORIC ACID

Hans Zirngibl, Duisburg, and Hans Joachim Kappey, Krefeld, Germany, assignors to Farbenfabriken Bayer Aktiengesellschaft, Leverkusen, Germany, a German corporation
No Drawing. Filed July 26, 1962, Ser. No. 212,707
Claims priority, application Germany, Aug. 5, 1961, F 34,619; Mar. 1, 1962, F 36,153
8 Claims. (Cl. 23—202)

This invention is concerned with a process for the decomposition of titanium dioxide-containing minerals in which hydrochloric acid is used.

It is known that minerals containing titanium dioxide can be decomposed with hydrochloric acid and that usually dilute boiling hydrochloric acid is used for this purpose. Some processes operate with an excess of hydrochloric acid and others with a deficiency thereof. An excess is present when a quantity of hydrochloric acid is used which is greater than those stoichiometrically necessary for dissolving the metal oxides present in the ore. That amount which is stoichiometrically necessary for titanium oxide is 2 mols of hydrogen chloride to 1 of titanium dioxide These processes result in the extraction of the secondary constituents from the minerals, for example, ilmenite, which constituents are principally iron, magnesium and aluminum oxides, but only in the extraction of a small quantity of titanium dioxide, so that a crude titanium dioxide is left which still contains various undissolved impurities.

According to another known process, the crude titanium dioxide which is recovered is separated by screening from coarse impurities, such as silica, pyrites, and undecomposed ilmenite. In this manner, it is possible to recover a crude titanium dioxide with about 96% $TiO_2$.

In accordance with another known process, ilmenite is treated with concentrated hydrochloric acid in a quantity which is very much less than the stoichiometric amount and extraction is started at about 60° C. Over 2 or 3 days, as the decomposition progresses the temperature is lowered to about 35° C. The titanium dioxide is dissolved, but the yield with a single extraction is at most about 50%.

It has now been found that minerals containing titanium dioxide can be decomposed more advantageously with concentrated hydrochloric acid by treating such minerals at a temperature of from 55° to 65° C. with such a quantity of acid that the final liquor still contains about 2 to about 5 mols of hydrogen chloride to 1 mol of dissolved titanium, the final liquor then being worked up for recovery of titanium dioxide therefrom.

According to the invention therefore there is provided a process for the decomposition of minerals containing titanium dioxide for the recovery of the titanium values therefrom which comprises treating the minerals with concentrated hydrochloric acid at a temperature of between 55° and 65° C.; the quantity of acid used being such that the final liquor contains from 2 to 5 mols of hydrogen chloride per mol of dissolved titanium and working up the decomposition product for the recovery of titanium values therefrom.

The decomposition of the minerals with the excess concentrated hydrochloric acid under the conditions according to the invention can with advantage also be carried out continuously, preferably in counter-current.

By the process according to the invention, there is dissolved, in addition to the titanium dioxide, the major part of the other oxides present in the mineral, namely, ferrous and ferric oxides, some magnesium oxide and some aluminum oxide. The fact that by this process the titanium dioxide is also almost completely dissolved is apparently due to the maintenance of the decomposition temperature indicated and of the excess of concentrated acid.

The titanyl chloride dissolved in the final liquor can be recovered without hydrolysis losses as titanium dioxide hydrate by reducing the trivalent iron contained in the solution to divalent iron, saturating the solution with hydrogen chloride, separating the chlorides so precipitated, removing the hydrogen chloride again from the filtrate, advantageously in vacuo, diluting the solution with water and heating and separating of the titanium dioxide hydrate which is thus precipitated. The filtrate is then preferably concentrated by re-introducing hydrogen chloride and returning it for a fresh decomposition. Substantially pure titanium dioxide can then be obtained by dehydrating the titanium dioxide hydrate.

Iron, and, if desired, also zinc, aluminum, activated hydrogen, hydroxylamine, sulphur dioxide, formaldehyde and the like can, for example, be used as reducing agents for the reduction of the trivalent iron. Reduction can also be effected electrolytically.

Ultra-pure titanium tetrachloride can also, if desired, be recovered in a manner known per se, from the final liquor. Once again, the trivalent iron is initially reduced to divalent iron and the solution is saturated with hydrogen chloride while cooling. After separating out the chlorides consequently precipitated the temperature is lowered and the stoichiometric quantity of potassium chloride is added to the filtrate so that potassium hexachlorotitanate precipitates in pure form with an excellent yield, which titanate, when filtered off and dried by heating to temperatures above 400° C. can be split into titanium tetrachloride and potassium chloride. The potassium hexachlorotitanate can also be converted in known manner by hydrolysis into titanium dioxide hydrate or into titanium dioxide.

In order still further to increase the content of dissolved titanium in the final liquor, the process according to the invention may be modified by returning some of the titanyl chloride solution, saturated with hydrogen chloride and present after the precipitation of the chlorides, for a fresh decomposition reaction and at the same time a corresponding amount of fresh hydrochloric acid is replaced. The total quantity of hydrogen chloride necessary for the decomposition may consist of about 10 to 25% in the form of returned final liquor and to about 90 to about 75% of fresh hydrochloric acid or reconcentrated waste acid.

The final liquor of the decomposition can also be worked up by reducing the trivalent iron contained therein to divalent iron, but then with driving off of substantially all the hydrogen chloride by heating, advantageously up to the boiling point, so that the crude titanium dioxide hydrate precipitates, separating out this crude precipitate, saturating the filtrate once more with hydrogen chloride, separating the chlorides which precipitate and returning the filtrate to a fresh decomposition.

This process can, if desired, be modified by effecting the reduction of the trivalent iron present in the decomposition solution only after driving off the hydrogen chloride and separating the precipitated titanium dioxide hydrate.

The driving off of the hydrogen chloride from the decomposition solution can be accelerated by reducing the solubility of the hydrogen chloride by adding ferric chloride, advantageously that from a previous working up batch.

In both processes for working up the liquor of the decomposition mentioned above the saturation of the filtrate with hydrogen chloride is preferably effected at such a temperature that a substantially 35% acid is obtained so that the final filtrate can readily be used again for a fresh decomposition. If it is desired to crystallize out the chloride, namely ferrous chloride tetrahydrate, as completely as possible, the mixture can thereafter be cooled still further, for example, to about 15° C.

For the saturation of the filtrate with hydrogen chloride, it is possible to use the hydrogen chloride driven out of the decomposition solution, if desired, supplemented by fresh hydrogen chloride.

As distinct from the process mentioned initially, in which the minerals are decomposed with boiling hydrochloric acid, the secondary constituents are extracted and a crude, highly impure titanium dioxide is obtained, the crude titanium dioxide formed by the second working up process mentioned above is exceptionally pure. Its $TiO_2$-content is usually higher than 99%.

In order that the invention may be further understood, the following examples are given, by way of illustration only:

EXAMPLE 1

(a) 1000 grams of ilmenite of the following composition:

| | Percent by weight |
|---|---|
| $TiO_2$ | 43.9 |
| FeO | 34.5 |
| $Fe_2O_3$ | 13.8 |
| $Al_2O_3$ | 1.1 |
| MgO | 4.0 |
| $SiO_2$ | 2.0 | are stirred for 8 hours at 60° C. with 4000 grams of 35% hydrochloric acid. The residue is then separated from the solution by decantation filtration. The quantity of the residue is 79 grams containing 8.07% (corresponding to 6.37 grams) of titanium dioxide. 98.5% of the titanium has consequently dissolved. In the final solution, the molar ratio between HCl and $TiO_2$ is 4:1.

(b) 1000 grams ilmenite are treated for 8 hours at 60° C. with 3400 grams of 35% hydrochloric acid. The residue is separated from the solution. The quantity of residue is 112.1 grams containing 20.1% (corresponding to 22.5 grams) of titanium dioxide. Consequently, the yield of dissolved titanium is 95%. The molar ratio between HCl and $TiO_2$ in the final solution is 3.4:1.

The final solutions according to (a) and (b) are further processes in accordance with Example 4 or 5.

EXAMPLE 2

In an extraction battery consisting of four stirrer-type vessels, ilmenite is treated with 35% hydrochloric acid in counter-current. After stirring for one hour, the solution is in each case siphoned off into the adjacent vessel with a little extracted material, while the acid of the preceding vessel is allowed to act on the residue. Thus, every 2 hours, concentrated solution is obtained on one side of the extraction battery and the extraction residue is obtained on the other side. The total reaction time is 7 hours. The reaction temperature is in the region of 60° C.

3110 grams of 35% hydrochloric acid are used to 1000 grams of ilmenite and 4060 grams of concentrated solution and 50 grams of residue are obtained. The molar ratio between HCl and $TiO_2$ in the final solution is calculated as being 2.2:1.

*Analysis of the final liquor*

| | Percent by weight |
|---|---|
| $TiO_2$ | 10.7 |
| $FeCl_2$ | 14.4 |
| $FeCl_3$ | 8.2 |

*Analysis of the extraction residue*

| | Percent by weight |
|---|---|
| $TiO_2$ | 2.5 |
| $Fe_2O_3$ | 17.7 |

This represents a yield of dissolved titanium dioxide of more than 99.5%. With a density of 1.46 (40° C.), the solution contains 156 grams of $TiO_2$/l.

The final liquor is further processed according to Example 4 or 5.

EXAMPLE 3

Ilmenite is continually extracted in counter-current with 35% hydrochloric acid in an apparatus which consists of four series-arranged stirrer-type vessels, each with a settling vessel on the output side for the separation of the respective extraction residue from the solution. From the first settling vessel, considered from the direction of travel of the acid, the extraction residue is removed and from the last settling vessel the clear concentrated decomposition solution runs over. 1250 grams of ilmenite and 4400 grams of 35% hydrochloric acid pass through in 5 hours. The total reaction time is 7½ hours with a temperature of 58–62° C. 79 grams of residue are obtained with 5.5% (corresponding to 4.4 grams) of $TiO_2$ and 5570 grams of solution with 9.7% of $TiO_2$, 13.4% of $FeCl_2$ and 6.4% of $FeCl_3$. With a density of 1.43, the solution contains 139 grams of $TiO_2$/l. With a molar ratio between HCl and $TiO_2$ such as 3.3:1 in the solution, the yield of dissolved titanium dioxide is 99.0%.

The solution is further worked up according to Example 4 or 5.

EXAMPLE 4

4000 grams of the solution obtained according to Example 3 are treated at 65–70° C. with iron until 3 grams of $Ti^{3+}$/l. are to be found in the solution. 1210 grams of hydrogen chloride are then introduced with gradual cooling. The solution saturated at 5° C. with hydrogen chloride is separated from the precipitated chlorides. The solution (3760 grams) contains 9.8% of $TiO_2$, as well as 45.7% of HCl and 1.2% of $FeCl_2$.

Hydrogen chloride is then removed from the solution in vacuo at 45–55° C. The solution (2660 grams) still contains 25% of HCl and 13.8% of $TiO_2$. It is introduced dropwise into 665 ml. of boiling water. The precipitated titanium dioxide hydrate is filtered off after 3 hours. 2630 grams of filtrate containing 22.2% of HCl and 0.5% of $TiO_2$ are recovered. 520 grams of hydrogen chloride are then introduced with cooling. The solution thus obtained containing 35% HCl is returned for a fresh decomposition in accordance with Example 3.

EXAMPLE 5

364 grams of a solution freed from iron chloride by introducing hydrogen chloride and having 10.0% of $TiO_2$ and 46% of HCl obtained in a manner as described in Example 4 are mixed for two hours with a total of 68 grams of potassium chloride with stirring at 13° C. whilst further hydrogen chloride is introduced. After another hour, the yellow precipitate of potassium hexachlorotitanate which forms is filtered off. It is dried with dry hydrogen chloride, the temperature of which is gradually raised to 250° C. The yield consists of 152.5 grams of potassium hexachlorotitanate, i.e. 99% of the titanium used in the solution was precipitated.

The potassium hexachlorotitanate is further worked up by the following two methods:

(a) 100.0 grams of hexachlorotitanate are gradually heated to 660° C. Titanium tetrachloride distils off and is condensed. The decomposition residue of 44.4 grams contains 0.67% (corresponding to 0.3 grams) of titanium dioxide. 98.7% of the titanium contained in the hexachlorotitanate are thus distilled off as titanium tetrachloride.

(b) 45.0 grams of hexachlorotitanate are dissolved in 150 ml. of water. The titanium dioxide hydrate precipitated by boiling is filtered off, suspended in hot water containing hydrogen chloride in order to purify it, and again filtered and heat-treated. The yield is 10.4 grams of titanium dioxide, corresponding to 98% of the titanium introduced in the hexachlorotitanate.

EXAMPLE 6

In an extraction battery as in Example 2, but with only three stirrer-type vessels, ilmenite is treated with hydrochloric acid. Only 80% of the necessary hydrogen chloride in the form of 35% acid is reacted with the extracted ilmenite. The residue is added to the reaction mixture in the second stirrer-type vessel, considered from the direction of travel of the acid, in the form of the final solution freed from iron according to Example 4 and having 12.4% of $TiO_2$ and 34% of free HCl. The reaction temperature is 60° C. and the total reaction time is 5 hours.

2850 grams of 35% hydrochloric acid and 740 grams of decomposition solution freed from iron are used for 1000 grams of ilmenite. As well as a dissolution residue of 65 grams with 4.5% (corresponding to 3 grams) of $TiO_2$, there are obtained 4500 grams of final solution with a density of 1.49 (60° C.). It thus contains 175 grams of $TiO_2$/l.

*Analysis of the final solution*

| | Percent by weight |
|---|---|
| $TiO_2$ | 11.7 |
| $FeCl_2$ | 13.7 |
| $FeCl_3$ | 6.1 |

This is worked up in accordance with Example 4 or 5.

EXAMPLE 7

Ilmenite of the composition set out below is treated with 35% hydrochloric acid in counter-current in an extraction battery comprising three stirrer-type vessels.

| | Percent by weight |
|---|---|
| $TiO_2$ | 43.9 |
| FeO | 34.5 |
| $Fe_2O_3$ | 13.8 |
| $Al_2O_3$ | 1.1 |
| MgO | 4.0 |
| $SiO_2$ | 2.1 |

After stirring for one hour, the solution is in each case siphoned off into the next adjacent vessel with a little extracted material, while the acid of the preceding vessel is allowed to act on the residue. Thus, every two hours, concentrated solution is obtained on one side of the extraction battery and extraction residue on the other side. The total decomposition time is 5 hours and the reaction temperature is in the region of 60° C.

3570 grams of acid are used to 1000 grams of ilmenite and 4510 grams of solution and 60 grams of residue are obtained. The residue contains 4.5%, corresponding to 2.7 grams of titanium dioxide. The molar ratio between HCl and $TiO_2$ in the final solution is in the region of 3.3:1.

*Analysis of the solution*

| | Percent by weight |
|---|---|
| $TiO_2$ | 9.65 |
| $FeCl_2$ | 13.0 |
| $FeCl_3$ | 6.2 |
| $AlCl_3$ | 0.2 |
| $MgCl_2$ | 1.4 |

The yield of dissolved titanium dioxide is thus more 99%.

(a) 4148 grams of the solution are treated at 65–70° C. with metallic iron, until all trivalent iron is reduced to divalent iron and in addition 1.5 grams of $Ti^{3+}$/l. are present. This requires 45 grams of iron. The solution which is recovered is boiled for 3 hours in a reflux condenser. 18 grams of water as well as 372 grams of hydrogen chloride escape. A greyish white product precipitates, which unwashed contains 75.8% of $TiO_2$ and 4% of $FeCl_2$, and after washing with 5% hydrochloric acid, still contains 0.11% of $FeCl_2$, corresponding to 0.06% FeO. The filtrate still contains 0.4% of $TiO_2$.

3100 grams of the filtrate are saturated at 37° C. with hydrogen chloride and about 730 grams of HCl are taken up. Crystallization of the $FeCl_2 \cdot 4H_2O$ is completed at 12° C. The filtrate (2630 grams) contains 0.4% of $TiO_2$, 1.6% of $FeCl_2$ and 34.9% of HCl. It is returned for a fresh decomposition.

(b) 4148 grams of the solution are boiled for 3 hours under reflux and 395 grams distil off, of which 362 grams are hydrogen chloride. A yellowish white product precipitates which after filtration but before washing, has the following composition:

| | Percent by weight |
|---|---|
| $TiO_2$ | 74.2 |
| $FeCl_3$ | 3.0 |
| $FeCl_2$ | 1.34 |

After thorough washing with 5% hydrochloric acid, the product still contains 0.21% of $FeCl_3$, corresponding to 0.11% of $Fe_2O_3$.

The filtrate (3220 grams) obtained in addition to the yellowish white product still contains 0.13% of titanium dioxide.

3100 grams of this filtrate are treated at 70–80° C. with metallic iron until no more trivalent iron can be detected. This requires 70 grams of iron. The solution thus obtained is saturated at 37° C. with hydrogen chloride, which requires 750 grams. The mixture is cooled to 12° C. in order to complete the crystallization of the $FeCl_2 \cdot 4H_2O$. The crystallizate is then separated. 2600 grams of filtrate are obtained which contains.

| | Percent by weight |
|---|---|
| $FeCl_2$ | 1.57 |
| $TiO_2$ | 0.1 |
| HCl | 35.4 |

This is returned for a fresh decomposition.

(c) In an iron vessel which is connected as cathode, the decomposition solution flowing through is reduced electrolytically. The anode space is separated by a diaphragm and filled with concentrated hydrochloric acid. Graphite rods serve as anode. At 4.5 volts and 20 amps, the electrolysis is so controlled by the flow velocity of the catholyte that 1.5 grams of $Ti^{3+}$/l. are present in the discharging solution. The temperature in the cathode space is kept at 60° C. by a heating coil. 4148 grams of decomposition solution are passed through.

1050 grams of 96° $FeCl_2 \cdot 4H_2O$ from another batch are added to the reduced solution before the solution is boiled for 2 hours on a reflux condenser. 390 grams of hydrogen chloride are driven off, as well as 19 grams of water. The precipitated greyish white product contains, unwashed, 70% of $TiO_2$ and 6.7% of $FeCl_2$, while when washed with hydrochloric acid, it contains 0.13% of $FeCl_2$, corresponding to 0.07% of FeO. The filtrate still contains 0.09% of $TiO_2$.

4100 grams of the filtrate are saturated with hydrogen chloride and further treated. After filtering off the precipitated $FeCl_2 \cdot 4H_2O$, 2800 grams of filtrate are obtained with 0.1% of $TiO_2$, 1.73% of $FeCl_2$ and 35.4% of HCl; the solution can be used again for a fresh decomposition.

We claim:

1. A process for the recovery of titanium from titaniferous ores which comprises:

(a) leaching said ores with concentrated hydrochloric acid at a temperature of between 55° and 65° C. thereby producing a slurry comprising solid material and liquor, said liquor containing dissolved therein substantially all the titanium content of said ore, the amount of acid used being such that the liquor contains 2 to 5 moles of hydrogen chloride per mole of dissolved titanium, (b) separating the solid material of the slurry from the liquor, (c) reducing dissolved trivalent iron chloride contained in the liquor to divalent iron chloride, (d) saturating the liquor with hydrogen chloride and separating the resulting precipitate from the liquor, (e) evaporating the hydrogen chloride from the liquor, (f) diluting the liquor with water whereby titanium dioxide hydrate is precipitated and (g) separating the titanium dioxide hydrate from the liquor.

2. The process of claim 1 wherein a portion of the liquor obtained in step (d) is combined with concentrated hydrochloric acid and said solution is used to leach the ore in step (a).

3. The process of claim 1 wherein the liquor obtained in step (g) is saturated with hydrogen chloride to about a 35% acid concentration and is combined with concentrated hydrochloric acid and the resulting solution is used to leach the ore in step (a).

4. A process for the recovery of titanium from titaniferous ores which comprises:

(a) leaching said ores with concentrated hydrochloric acid at a temperature of between 55° and 65° C. thereby producing a slurry comprising solid material and liquor, said liquor containing dissolved therein substantially all the titanium content of said ore, the amount of acid used being such that the liquor contains 2 to 5 moles of hydrogen chloride per mole of dissolved titanium, (b) separating the solid material of the slurry from the liquor, (c) reducing dissolved trivalent iron chloride contained in the liquor to divalent iron chloride.

(d) saturating the liquor with hydrogen chloride and separating the resulting precipitate from the liquor, (e) adding a stoichiometric quantity of potassium chloride to the liquor whereby the titanium is precipitated as potassium hexachlorotitanate and (f) separating the potassium hexachlorotitanate from the liquor.

5. A process for the recovery of titanium from titaniferous ores which comprises:

(a) leaching said ores with concentrated hydrochloric acid at a temperature of between 55° and 65° C. thereby producing a slurry comprising solid material and liquor, said liquor containing dissolved therein substantially all the titanium content of said ore, the amount of acid used being such that the liquor contains 2 to 5 moles of hydrogen chloride per mole of dissolved titanium, (b) separating the solid material of the slurry from the liquor, (c) reducing dissolved trivalent iron chloride contained in the liquor to divalent iron chloride, (d) evaporating the hydrochloric acid used for leaching from the liquor by heating whereby the titanium precipitates as titanium dioxide hydrate, (e) separating the titanium dioxide from the liquor.

6. The process of claim 5 wherein the liquor obtained in step (e) is saturated with hydrogen chloride, the resulting precipitate is separated from the liquor, the liquor is combined with concentrated hydrochloric acid and the resulting solution is used to leach the ore in step (a).

7. The process of claim 6 wherein the hydrogen chloride evaporated in step (d) is used to saturate the liquor obtained in step (e).

8. A process for the recovery of titanium from titaniferous ores which comprises:

(a) leaching said ores with concentrated hydrochloric acid at a temperature of between 55° and 65° C. thereby producing a slurry comprising solid material and liquor, said liquor containing dissolved therein substantially all the titanium content of said ore, the amount of acid used being such that the liquor contains 2 to 5 moles of hydrogen chloride per mole of dissolved titanium, (b) separating the solid material of the slurry from the liquor, (c) evaporating the hydrochloric acid used for leaching from the liquor by heating whereby the titanium precipitates as titanium dioxide hydrade, (d) separating the titanium dioxide from the liquor, (e) reducing dissolved trivalent iron chloride contained in the liquor to divalent iron chloride, (f) saturating the liquor with hydrogen chloride and separating the resulting precipitate from the liquor, (g) combining the liquor with concentrated hydrochloric acid and using the resulting solution to leach the ore in step (a).

References Cited by the Examiner
UNITED STATES PATENTS

| | | | |
|---|---|---|---|
| 1,333,849 | 3/1920 | Olsen | 23—202 |
| 1,891,911 | 12/1932 | Brode et al. | 32—202 |
| 2,441,856 | 5/1948 | Turner et al. | 23—202 |
| 2,527,257 | 10/1950 | Judd | 23—202 |
| 2,589,909 | 3/1952 | Weikel | 23—202 |
| 2,857,242 | 10/1958 | Schossberger | 23—51 |
| 3,071,439 | 1/1963 | Solomka | 23—202 |
| 3,104,950 | 9/1963 | Ellis | 23—51 X |

MAURICE A. BRINDISI, *Primary Examiner.*